UNITED STATES PATENT OFFICE.

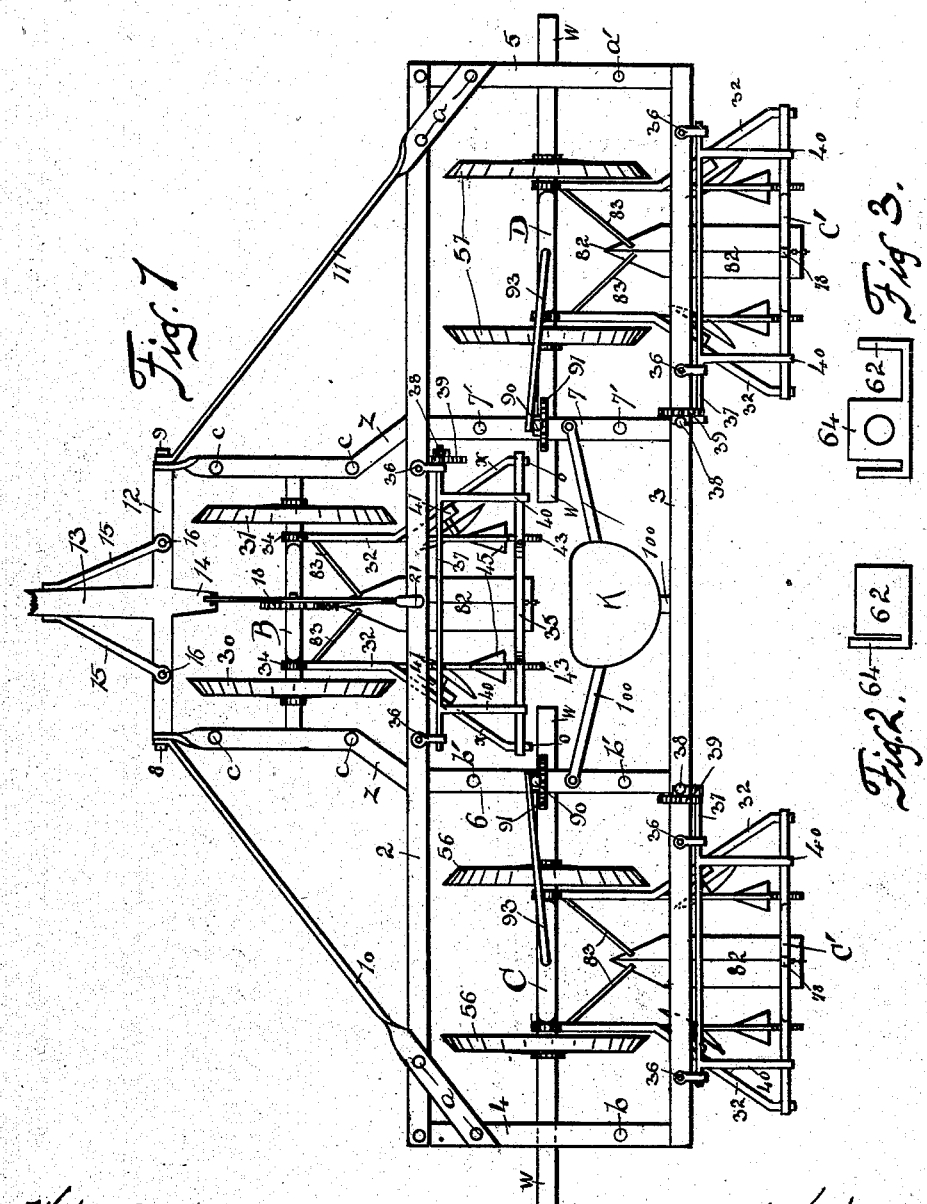

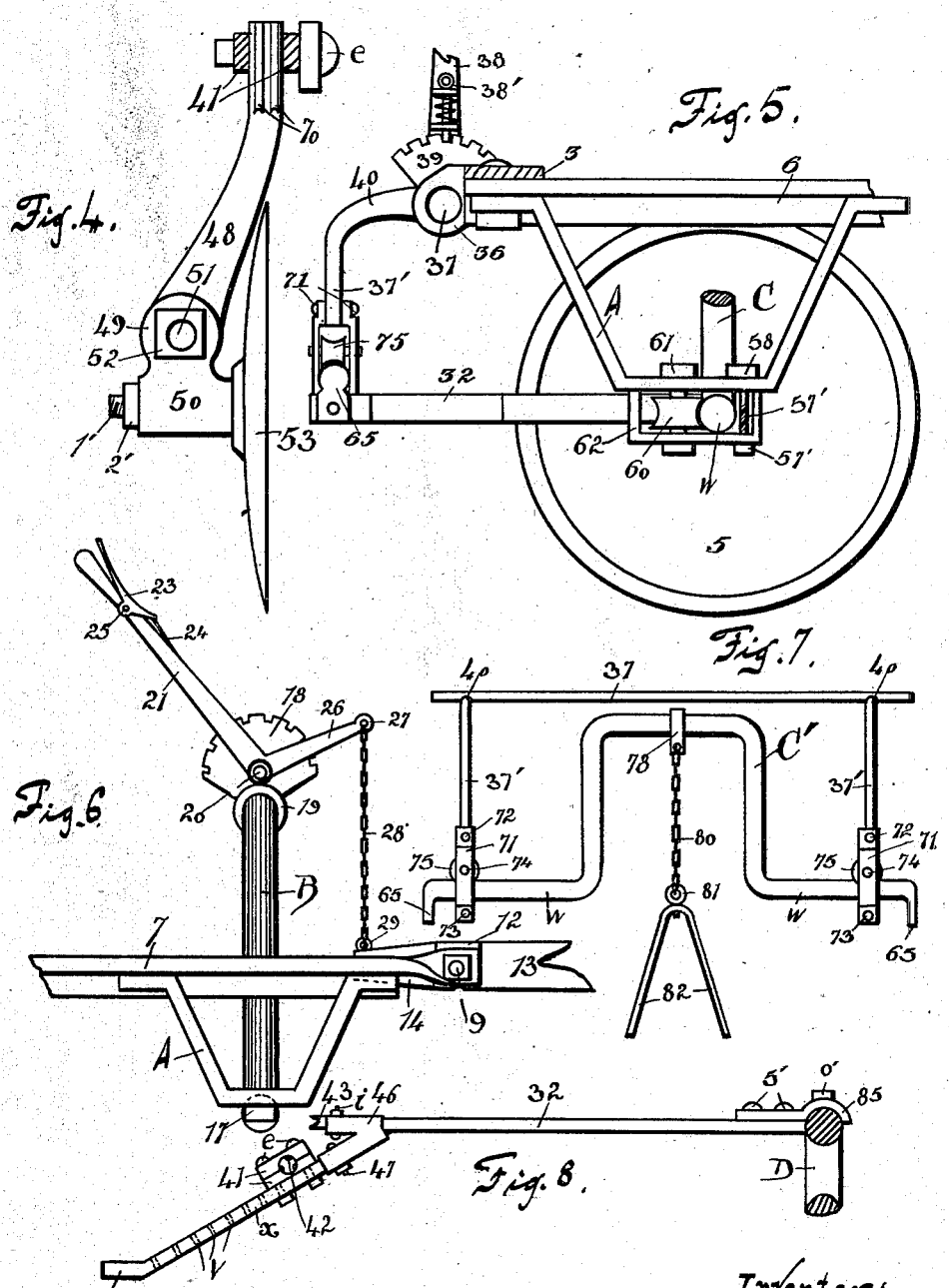

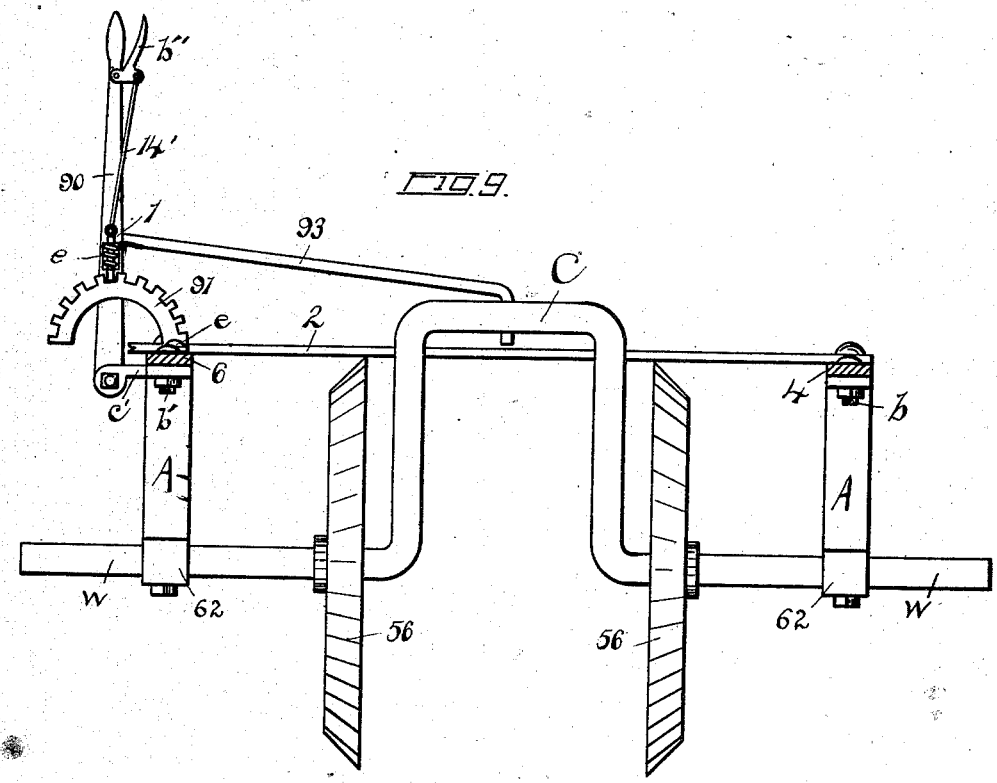

WILLIAM W. BOTT, OF NARKA, KANSAS, ASSIGNOR OF ONE-HALF TO WINFIELD S. PREBLE, OF NARKA, KANSAS.

THREE-ROW DISK CULTIVATOR.

SPECIFICATION forming part of Letters Patent No. 714,442, dated November 25, 1902.

Application filed November 1, 1901. Serial No. 80,781. (No model.)

*To all whom it may concern:*

Be it known that I, WILLIAM W. BOTT, residing at Narka, in the county of Republic and State of Kansas, (whose post-office box is 166,) have invented certain useful Improvements in Three-Row Disk Cultivators; and I do hereby declare that the following is a full, clear, and exact description of the invention, such as will enable others skilled in the art to which it appertains to make and use the same, reference being had to the accompanying drawings, which form a part of this specification.

This invention relates to a novel improvement in three-row disk cultivators.

The object of my invention is to provide a cultivator adapted to be used in the cultivation of listed corn and the like.

The aim of my invention is more particularly to provide a cultivator so arranged that three rows may be simultaneously cultivated; and my invention embodies the combination of certain instrumentalities, as will be set forth more fully hereinafter.

In the accompanying drawings I have shown, in Figure 1, a top view, with portions broken away, of a three-row cultivator embodying my invention. Figs. 2 and 3 disclose, respectively, an end and front view of the axle-shield used in my invention. Fig. 4 discloses an enlarged detached detail, partly in section, showing the arrangement of one of the disks and disk-support as used in my invention. Fig. 5 shows an enlarged detail with portions removed, disclosing one of the bearings used in supporting one of the main axles and further discloses the mechanism used in vertically adjusting the disks and shovels. Fig. 6 shows an enlarged detail of the mechanism I use in raising the forward set of cultivator-disks. Fig. 7 shows an enlarged rear view disclosing the position of one of the main supporting-axles. Fig. 8 discloses a top view illustrating the mechanism used in securing the disk-boxing and shovel-shank to one of the drag-bars. Fig. 9 shows an enlarged detail of the mechanism used for shifting the disks, while Fig. 10 shows a drag-bar and connected cultivator-shovel.

In the cultivation of corn, especially in listed corn, it is found that soon after planting a growth of weeds or other objectionable vegetation makes its appearance adjacent the furrows. Later the weeds make their appearance upon the ridges adjacent the furrows.

Now the aim of my invention is to provide a cultivator embodying certain adjustable instrumentalities, so that the operator may carry the cultivator over the field and in the first operation set a disk so as to cut and throw away from the plant the first growth of weeds, while a trailing shovel is used to loosen up the earth adjacent the plants. Upon going over the field a second time with my cultivator the disks and shovels, which are interchangeably secured, are reversed and adjusted in such a position that the disks travel adjacent the plants to work the dirt toward them, while the shovels are set to cultivate the ridge adjacent the plants to destroy the objectionable vegetation and at the same time bank up the dirt adjacent the growing plant to husband the moisture.

In fulfilling the aim of my invention I construct a supporting-frame provided with three wheels and a tongue which is adjustably secured to the frame, so that the forward or lead set of supporting-wheels may be raised from the earth in turning the cultivator, while the frame further carries three sets of disks and shovels adjustably secured, and between each set of shovels is held a shield.

My invention further embodies a simply-operated mechanism, so that the side shovels and disks may be instantly operated and adjusted to throw them into proper alinement, while the disks and shovels in turn are provided with mechanisms, so that the same may be vertically adjusted as well as laterally.

In the accompanying drawings, 2 and 3 represent two bars transversely arranged and preferably made of angle-iron. These bars 2 and 3 are united by means of the terminal bars 4 and 5, while intermediately I provide the longitudinally positioned and extending frame members 6 and 7, these frame members also preferably being of angle-iron. For the sake of convenience I bend these members 6 and 7 as is shown at Z in Fig. 1.

Extending from the forward ends of the frame members 6 and 7 and held by means of suitable bolts 8 and 9 are the brace-rods 10 and 11, which by means of suitable bolts $a$ are secured to the frame members 2, 4, and 5, as shown. These frame members 2, 3, 4, 5, 6, and 7 are secured by any suitable means.

Pivotally secured between the forward ends of the frame members 6 and 7 is a bar 12, which bar receives the bolts 8 and 9, and to this bar 12 is secured the tongue 13, which is made to project at the rear inwardly between the frame members 6 and 7, as is clearly shown at 14 in Fig. 1. Securing the tongue 13 to the pivotally-held bar 12 are the braces 15 15, held by means of suitable bolts 16 16.

Secured to the frame members 4, 5, 6, and 7 are six depending counterpart brackets A, one of the brackets being shown in detail in Figs. 5 and 6. These brackets are disposed below the frame and are secured by means of suitable bolts. The bracket secured to the bar 4 is held by means of one of the bolts $a$ and the bolts $b$. The bracket secured to the frame member 6 between the bars 2 and 3 is secured by means of the bolts $b'$, as shown in Fig. 9, the bracket secured to the frame member 7 between the bars 2 and 3 being secured by means of the bolts $7'$, and the bracket below the frame member 5 being held by means of the bolts $a$ and $a'$. The brackets secured to the forward ends of the frame members 6 and 7 are held by means of the bolts $c$ $c$.

Secured to the brackets A, fastened below the forward portion of the frame members 6 and 7 by any suitable means, is an arched axle B, a detail of which is disclosed in Fig. 6. This arched axle has its end flattened, as is shown at 17, and these flattened ends are secured to the brackets A by any suitable means. This fixed arched axle B (as well as the counterparts—shiftably-secured axles C and D) is arched upward, as is disclosed in Fig. 9, to permit the ready passage of the growing plants below the cultivator, as is common in implements of this class. Secured to this forward fixed axle B, as is shown in Fig. 6, is a notched sector 18, provided with a suitable collar 19, so that the same may be suitably secured to this fixed axle B. Tiltably secured to this notched sector 18 and held by means of a pin 20 is an L-shaped lever 21, provided with the thumb-latch 23, from which extends a bar 24, leading to a suitable pin adapted to engage the notches within said sector 18, so that said lever may be adjustably secured. The thumb-latch 23 is secured by means of a suitable pin 25, as illustrated. The lower projecting end 26 of this lever 21 is provided with a terminal eye 27, adapted to engage a suitable chain 28, in turn secured to an eye 29, fixed within the rear portion 14 of the tongue 13, as will be understood in referring to Fig. 6.

Secured to the frame member 3 are the supporting-ears 36, as shown in Fig. 5, and these supporting-ears adjustably hold a shaft 37, which at one end is provided with an adjusting-lever 38, working in conjunction with a notched sector 39, similar in operation to the lever 21 described. Extending from this shaft 37 are the two arms 40 shown in Fig. 5, which arms are L-shaped and dip downward and are secured to the lower horizontal portions of the arched supporting-bar $C'$ disclosed in Fig. 7.

By means of the adjusting-lever 38 and the arched bars $C'$ the drag-bars 32 may be raised and lowered.

Extending from the axles C and D are the counterpart drag-bars 32, in all particulars being a duplicate of the drag-bars secured to the forward axle B. These drag-bars are angular, being bent, as shown at $x$ in Fig. 8, and terminate in a stub-section $o$, extending parallel to the main portion 32. These drag-bars 32, which are secured to the axles in sets of twos, are secured by means of collars 34, as shown in Fig. 1, surrounding the horizontal part of the axles, or secured by means of half-collars $34'$, secured to the vertical portion of the axle, as shown in Fig. 8, held by means of the bolts $5'$ and $o'$. Secured to each drag-bar 32 is a suitable boxing 41, which is adjustably secured to the perforated portion $x$ of the drag-bar.

In Fig. 8 I have shown in detail one of these boxings 41, which are preferably in two halves and provided with a seating, having inwardly-projecting vertical ribs 42, the boxing being secured by means of suitable bolts $e$. It will be noticed that the portion $x$ of the drag-bar is provided with a plurality of openings, as is shown at $v$ in Fig. 10, so that these boxings 41 are adjustably secured to their drag-bars and may be changed from one side to the other, if desired. Each of these drag-bars 32 is further provided with an extending shovel-beam 43, provided with a suitable shovel 45, as is disclosed in Fig. 10. These shovels are of the usual construction and are such as are commonly employed in cultivators and are secured by their shanks $43'$. In my cultivator, however, these shovel-beams and the connected shovels are adjustably secured to the drag-bars. This I accomplish in using a V-shaped casting 46, one side of which, referring to Fig. 8, is adapted to be secured to the member $x$ of the drag-bar by means of the bolt 47, while the remaining side of the casting by means of the bolt $i$ is secured to the shovel-beam 43. By means of the removably-held boxing 41 the disk 53 may be placed in advance or to the rear of the shovel 45, as will be understood in referring to Fig. 10.

Held within each boxing 41 is a disk shank 48, the upper portion of which is provided with grooves 70, as is shown in Fig. 4, to receive the ribs 42 shown in Fig. 8, so that these shanks may be securely held within their boxings and be prevented from turning. Below these shanks are secured to suitable boxes 50. These boxes are provided with the upwardly-extending eyelets 49, by means of which they are secured to the shank 48. A suitable bolt 51 is used in conjunction with a nut 52 to secure this boxing 50 to the shank 48. By means of this connection the boxing 50 is tiltably secured to the shank, so that the disk 53, the stem 1' of which extends through the boxing, may be placed at any suitable angle. A nut 2' properly secures the disk. This disk 53, however, may be secured within the boxing by any suitable means. From this it will be seen that each arched axle is provided with two rearwardly and outwardly extending drag-bars 32 and that each drag-bar is provided with a disk and shovel adjustably secured thereto and that finally the drag-bars may be raised and lowered by means of the lever 38.

Secured to the brackets A, below the members 4, 5, 6, and 7, are the counterpart laterally-sliding arched axles C and D, one of which is shown in Fig. 9. These arched slidably-held axles have secured to them the supporting-wheels 56 and 57, so that the frame of my cultivator is supported upon six wheels. These axles C and D are in construction similar to the axle B, described above, with the exception that they have their lower horizontal members W extend beyond the frame members 4, 5, 6, and 7 and are shiftably secured within their brackets. As these shifting axles are counterparts and identical in construction, the description of one will suffice for that of the other.

In referring to Fig. 1 it will be noticed that the shifting axle D is provided with the supporting-wheels 57, the axle C being provided with the counterpart wheels 56. It might here be stated that these wheels 56 and 57 30 and 31 have their tread or peripheral edge inclined, as shown, so as to prevent the collection and accumulation of earth upon the same in the working of moist or clinging earth.

In Fig. 5 is shown a broken section of the axle C, which is identical in construction with the axle D, while in Fig. 9 is shown a front detail of the axle C. It will be noticed that the projecting end W of this axle C projects below the bracket A and in front, as shown in Fig. 5, is positioned between a bolt 57', secured by means of a nut 58 and against a roller 60, which is supported by means of a suitable bolt 61. These bolts 57' and 61 pass through and secure the frame 62, between which frame the horizontal portions W of the shifting axles work, as is clearly disclosed in Fig. 5.

In Figs. 2 and 3 I have shown, respectively, an end and a face view of one of these frames 62, which are provided upon the inside with the shield extension 64, provided with a central opening through which the end of the axle extends. These shield portions 64 are used to act as a stop for the wheels.

It might here be stated that the wheels 30 31 56 56 57 57 are preferably adjustably secured to their shafts C and D by any suitable means. I do not wish to confine myself to any specific method of securing these wheels to their shafts.

The arched bars C' have their ends 65 bent downward, so that they may be conveniently secured to the drag-bars 32. The forward frame member 2 is provided with counterpart ears 36 36, which are suitably secured and support the shafts 37. In connection with all the axles B, C, and D counterpart notched sectors 39 are used, which work in conjunction with counterpart adjusting-levers 38, so that these shafts 37 may be rocked to raise and lower the arms 40 to raise and lower the drag-bars 32. These drag-bars, however, are shiftably connected to the frame in order to insure their being adjusted to meet the requirements for simultaneously cultivating three rows.

In supporting the arch-bars C', I provide the arms 40 with the straps 71, secured by means of the pins 72 to form suitable housings, secured below by means of pins 73, as is clearly illustrated in Fig. 7. These strap-housings are provided at a suitable point with the stub-shaft 74, supporting a suitable pulley 75, which pulley works above and upon the lateral members W of the arched supporting-bars C'. These arched supporting-bars C' are provided with suitable collars 78, from which extend the chains 80, secured by means of an eye 81 to a suitable shield 82, as is disclosed in Figs. 7 and 1. At the forward ends suitable straps 83 secure the shields to the drag-bars 32. As has been set forth, in the use of this implement three rows may be simultaneously cultivated, and the disks and shovels used are so secured that the earth may be loosened and thrown either toward or away from the growing corn. The rear shovels and disks, which are used in pairs, are further easily adjusted from side to side by means of suitable levers 90, (shown in Fig. 9,) secured to the frame members 6 and 7 by means of the ears C', and these levers, which are identical to those previously described, work in conjunction with a notched sector 91, so that these levers 90 may be adjustably secured. Secured to these levers 90 are suitable reach-bars 93, which are at a convenient point secured to the axles, there being one of such reach-bars 93 secured to each axle C and D, so that the operator in shifting these levers 90 from side to side can bring the connected disks and shovels in proper alinement to correspond to any irregularities of the rows. Each lever 90 is provided with a thumb-latch $b''$, from which extends a rod 14', secured to a spring-operated pin $e'$, as shown in Fig. 9. At a suitable point I provide a suitable seat K for the operator, held by means of the supports 100, as disclosed in Fig. 1.

The device is simple of construction and the parts are readily accessible and adjustable.

Having thus described my said invention, what I claim as new, and desire to secure by United States Letters Patent, is—

1. The combination with a suitable supporting-frame, of a forward central arched axle, supporting-wheels secured to said forward axle, two counterpart rear arched supporting-axles, said rear axles being laterally shiftably secured to said frame, a set of drag-bars extending from each of said supporting-axles, supporting-wheels secured to said rear axles, adjustable hangers secured to said frame and to said drag-bars, mechanism to shift said rear axles from side to side, shovels adjustably secured to each drag-bar, and cutter-disks adjustably secured within each drag-bar, said shovels and disks being adjustably secured.

2. The combination with a suitable supporting-frame provided with a forward extension, of a fixed supporting-axle within said forward extension, supporting-wheels upon said fixed axle, two rear supporting-axles shiftably secured to said frame upon opposite sides, supporting-wheels secured to each frame, connecting-rods securing said rear shifting axles to said adjusting-levers, a set of drag-bars extending from each of said rear shiftably-secured axles, shovels adjustably secured to each of said drag-bars, cutter-disks adjustably secured to each of said drag-bars, hangers secured to said supporting-frame, levers operating said hangers, one hanger being secured to each set of drag-bars to raise and lower the same, a tongue tiltably secured to said bar, and an adjusting-lever secured to said frame and connected to said tongue, as and for the purpose set forth.

3. The combination with a supporting-frame, of a forward supporting-axle, two rear supporting-axles secured to said frame upon the opposite sides, supporting-wheels secured to each of said axles, a tongue pivotally secured to said frame, and an adjusting-lever, said lever being secured to said tongue to tilt said frame, as and for the purpose set forth.

4. The combination with a drag-bar provided with a straight portion and a portion continuing laterally therefrom, said lateral portion being perforated, a boxing being adjustably secured to said lateral portion, a shovel-holder being secured to said lateral portion, and mechanism to raise and lower said bar, all arranged substantially as and for the purpose set forth.

Signed in the presence of two witnesses.

WILLIAM W. BOTT.

Witnesses:
FREDERICK J. LARSON,
GEORGE W. SUES.